United States Patent Office 3,160,013
Patented Dec. 8, 1964

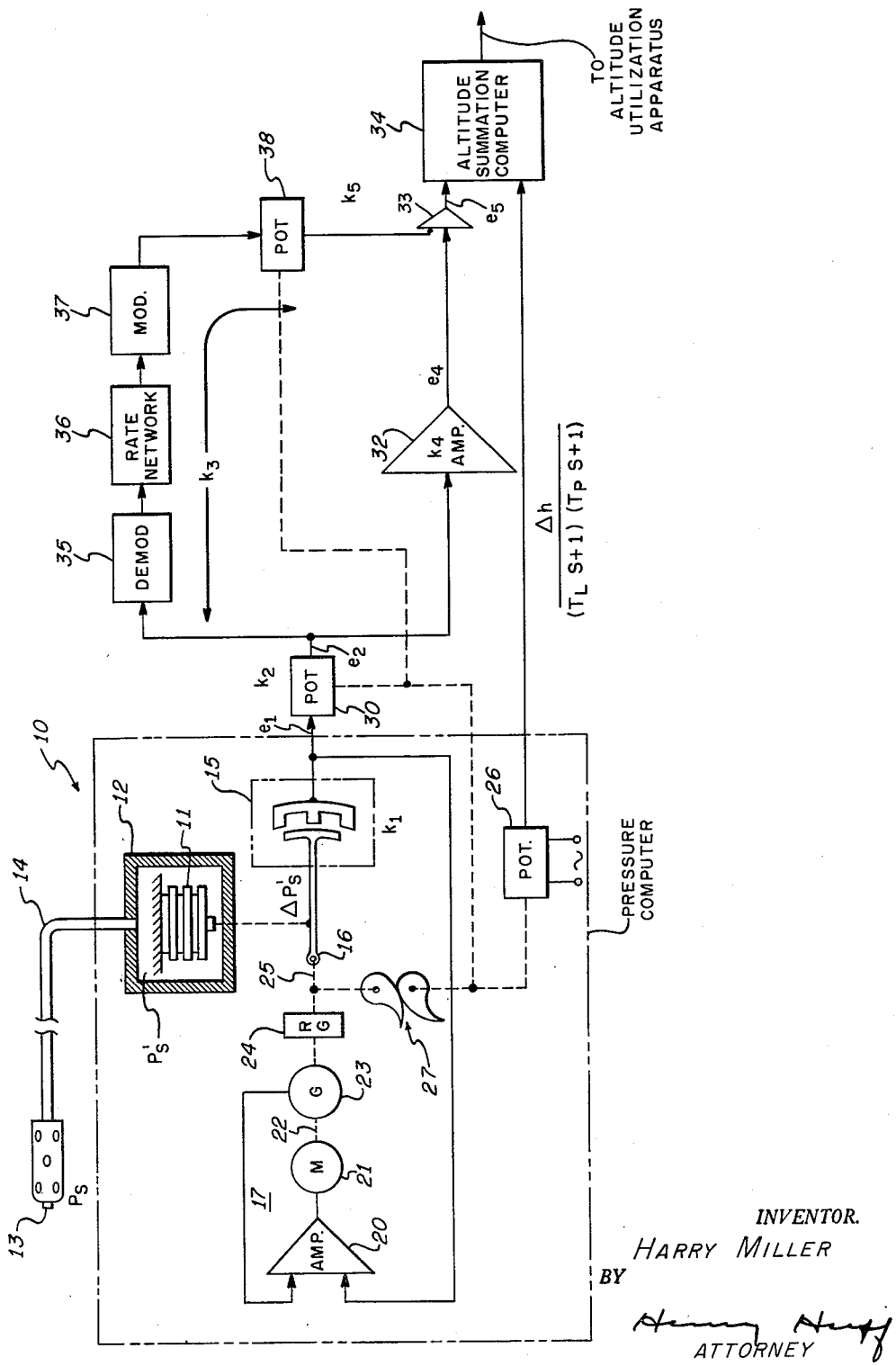

3,160,013
PRESSURE RESPONSIVE APPARATUS WITH LINE LAG AND VELOCITY ERROR CORRECTION
Harry Miller, Scottsdale, Ariz., assignor to Sperry Rand Corporation, Great Neck, N.Y., a corporation of Delaware
Filed June 6, 1961, Ser. No. 115,194
3 Claims. (Cl. 73—386)

This invention relates to sensitive pressure responsive apparatus, for example, of the type designed for controlling and/or measuring the altitude or air speed of a high performance aircraft. If used for the former purposes, the aneroid barometric unit, i.e., bellows, is evacuated and sealed so that it expands or tends to expand with increasing altitude while if used as an air speed responsive device, the exterior or one part of the unit is usually connected to static pressure and the interior or other part of the unit to a Pitot tube or other air speed responsive device. While the invention applies to both types of apparatus, for purposes of example, the invention will be described as applied to an automatic altitude control device of an automatic pilot for aircraft.

The present invention is particularly well adapted to be utilized with a force balance type of pressure computing device of the character disclosed in U.S. Patent 2,729,780 entitled Altitude Control for Automatic Pilots, of H. Miller et al. issued January 3, 1956 or of the character disclosed in U.S. Patent No. 3,100,858 entitled Pressure Rebalancing and Measuring Servosystem, of W. J. Topazio et al. issued August 3, 1963 and now U.S. Patent 3,100,858. The present invention when used with pressure computing devices of the type disclosed in the aforementioned patent and application respectively provides an extremely accurate measure of the pressure experienced by the aircraft for precisely controlling the performance, particularly of, high speed, high altitude aircraft.

The static pressure signal used for controlling the altitude of the aircraft is sensed by a pressure sensing probe such as a Pitot tube which is mounted on the airplane's nose boom and connected to the housing of the evacuated bellows of the pressure computer by means of a relatively long length of pneumatic tubing. Because of the long length of the pneumatic tubing and the relatively large volume of the housing into which the static pressure signal is connected, there are dynamic lags associated with the transmission of the pressure signal. For example, the lags associated with 750 feet of ⅜ inch O.D. tubing with a wall thickness of 0.035 inch and working into a volume representative of two pressure sensors have been calculated by means of lumped parameter transmission line equations. The equations employed for these calculations, while approximate for the general pneumatic transmission line problem, are accurate for the case of large lags. The maximum lag occurs at the highest altitude where the static pressure is reduced to a small fraction of the sea-level static pressure. At 100,000 feet, the roots of the second order equation which define the lags for the problem under consideration indicate a dominant 1.0 second time constant in the transient response of the signal through the line. If the definition of lag is taken as four times the time constant, that is, the time required for the response to reach 96 percent of the steady-state value, the one-second time constant results in a lag which exceeds permissible limits for certain applications.

Another undesirable effect known as velocity error is due to the operation of the follow-up servo loop of the pressure computer during climbs and descents. The follow-up servo loop cannot respond as rapidly as desirable and thus its action will lag the error output. The damping contributed by the tachometer feedback will also contribute to the lag particularly during steady climbs and descents when a steady state output from the pressure computer pick-off is required to balance out the steady output from the tachometer generator. Thus, the output signal from the pressure computer has undesirable characteristics due to the pneumatic transmission line lag and the velocity error introduced by the follow-up servo loop.

It is a primary object of the present invention to provide a pressure responsive device which has an output signal compensated for undesirable pneumatic transmission line lag and/or velocity errors.

It is an additional object of the present invention to provide a pressure responsive device which produces an output signal that has substantially the characteristics of the sensed input signal.

These and other objects are achieved by providing a signal from the forefront of the signal chain of the pressure computer which includes only pneumatic transmission line lag and advancing its phase to produce a rate signal to compensate for the pneumatic transmission line lag. The signal from the forefront of the signal chain is a displacement signal which does not include the velocity error due to the follow-up servo loop. The rate and displacement signals are then combined with the conventional output signal from the pressure computer in order to compensate for the undesirable characteristics of the conventional output signal and thereby provide an extremely precise control signal having substantially the characteristics of the sensed input signal.

The single drawing is a schematic wiring diagram incorporating the present invention in an altitude controlling type of pressure responsive apparatus.

A pressure computer 10 of the type disclosed in said U.S. Patent 2,729,780 includes an evacuated bellows 11 mounted within a housing 12. A Pitot tube 13 is mounted in the nose boom or other suitable location of an aircraft at a distance considerably spaced from the location of the pressure computer 10. The Pitot tube 13 senses the static pressure $P_s$ experienced by the aircraft and transmits this signal through a relatively long pneumatic transmission line 14 which connects to the interior of the housing 12. By virtue of this arrangement the bellows 11 is responsive to static pressure but due to the pneumatic transmission line lag explained above, the static pressure sensed by the bellows is $$P_s' = \frac{P_s}{T_L S + 1}$$

where $T_L$ represents a first order approximation of the pneumatic line lag and $S$ is the usual complex operator.

The evacuated bellows 11 has its movable end connected to position the armature of an E-pick-off 15 against the spring restraint of a torsion bar 16 in a manner more fully explained in the aforementioned patent and application. The signal from the stator of the E-pick-off 15 has an amplitude and phase representative of the magnitude and sense respectively of the armature displacement from a force balance central position.

The pick-off 15 is connected to an input terminal of a summing amplifier 20 which in turn is connected to control a servomotor 21. The output shaft 22 of the servomotor 21 is connected to drive a tachometer generator 23 and also, through a reduction gearing 24 and by means of a shaft 25, the torsion bar 16 is rotated in a direction to provide a restoring moment which opposes the moment resulting from the response of the bellows 11 to a pressure change. The restoring moment obtained by winding the torsion bar 16 returns the E-pick-off armature to its null position following any barometric pressure change which causes the bellows 11 to displace the armature. The tachometer generator 23 provides a rate signal which is connected to an input terminal of the summing amplifier 20 in feedback fashion to stabilize the force balance follow-up servo loop 17.

The shaft 25 is also connected by means of cams 27 to rotate the wiper of a potentiometer 26 which is suitably energized to provide a signal from the pressure computer 10 that is a function of the position of the shaft 25. The cams 27 are shaped to compensate for the fact that the rate of change of force exerted by the bellows 11 per unit of altitude variation is not linear but decreases with altitude. However, the signal from the potentiometer 26 includes undesirable characteristics due to the pneumatic transmission line lag and the velocity error of the follow-up servo loop 17 explained above and is representative of $$\frac{\Delta h}{(T_L S+1)(T_P S+1)}$$

where $\Delta h$ is the change in altitude and $T_P$ is the effective follow-up time constant of the static pressure computer 10.

In order to compensate for the undesirable characteristics of the signal from the potentiometer 26, the compensation technique of the present invention will now be described. It will be noted that the E-pick-off 15 is in the very forefront of the signal chain by virtue of being directly connected to the bellows 11 and thus responds very rapidly and very accurately to the pressure within the interior of the housing 12 as sensed by the bellows 11. The follow-up servo loop 17 of the pressure computer 10, however, cannot respond as rapidly and thus its action will lag the error output and the damping contributed by the tachometer generator 23 will also contribute to the lag particularly during steady state climbs and descents as explained above. Thus with the armature of the pick-off 15 directly responsive to the movement of the bellows 11, the signal $e_1$ from the E-pick-off 15 is representative of the displacement of the armature and does not include the follow-up servo-induced velocity error but only includes the pneumatic transmission line lag.

The signal $e_1$ from the pick-off 15 is related to the change in static pressure detected by the force balance mechanism output potentiometer 26 by the sensitivity factor $k_1$ so that $$e_1 = k_1 \Delta P_s' = k_1 \frac{\Delta P_s}{(T_L S+1)}$$

The pick-off signal $e_1$ is connected to energize a potentiometer 30. The wiper of the potentiometer 30 is connected through altitude-pressure correction cams 27 to the shaft 25 in order that the output signal $e_2$ of the potentiometer 30 is linearly related to the altitude rather than pressure. In other words, the potentiometer adjustment $k_2$ provides a correction proportional to the slope of the altitude pressure curve, $$\frac{\Delta h}{\Delta P_s}$$

Thus, $$k_2 = a_1 \frac{\Delta h}{\Delta P_s}$$

where $a_1$ is the proportionality constant.

The signal $e_2$ from the potentiometer 30 is thus $$e_2 = \frac{k_1 a_1 \Delta h}{(T_L S+1)}$$

which does not include a velocity error and can be used to compensate for the velocity error in the signal from the potentiometer 26. The displacement signal $e_2$ from the potentiometer 30 is applied through an amplifier 32 to make the gradient of this signal compatible with the gradient of the output of the potentiometer 26. The amplifier 32 in turn is connected to an input terminal of an algebraic summation device 33 that has its output terminal connected to an altitude summation computer 34. The amplifier 32 provides the required gain factor $k_4$ to make the gradient of its output signal $e_4$ compatible with the gradient of the output of the potentiometer 26 to which it is added in the altitude summation computer 34.

In order to compensate for the pneumatic transmission line lag $T_L$, the potentiometer 30 is connected to a demodulator 35 which in turn is connected to a rate network 36 and thence to a modulator 37 to derive electronic rates of the pick-off signal $e_2$. In order to provide the proper sensitivity factor $k_3$ a potentiometer 38 is connected to the modulator 37 and then to another input terminal of the algebraic summation device 33. The transfer function of the summed rate-plus-displacement correction signal $e_5$ from the device 33 is given by $$\left[\frac{e_5}{e_2}\right] = k_3 + k_4$$

where $$k_3 = \frac{k_5 T S}{(TS+1)}$$

and $T$ is the rate network time constant. Then, $$\left[\frac{e_5}{e_2}\right] = k_4 \frac{\left(1+\frac{k_5}{k_4}\right) TS+1}{TS+1}$$

The correction signal, $e_5$ is therefore:

$$e_5 = k_4 \frac{[(1+a_2)TS+1]}{TS+1} \left\{\frac{k_1 a_1 \Delta h}{T_L S+1}\right\}$$

where $$a_2 = \frac{k_5}{k_4}$$

the effective ratio of the rate of displacement gain. With $k_5$ adjusted so that $$(1+a_2)T = T_L$$

the pneumatic line time constant is cancelled and effectively replaced by the shorter rate-network time constant $T$, which can be made insignificant from the standpoint of lags. Thus, the correction signal $e_5$ is:

$$e_5 = \frac{k_1 a_1 k_4}{TS+1} \Delta h$$

The above equation shows that the output signal from the altitude summation computer 34 will begin correcting for an altitude change in accordance with true altitude data rather than the lagged data provided by the potentiometer 26 of the pressure computer 10. The significance of this correction is appreciated when it is noted that the data transmitted by the potentiomeer 26 indicates an error proportional to $$\frac{\Delta h}{(T_L S+1)(T_P S+1)}$$

where $\Delta h$ represents the change in altitude

The gain of the rate channel, $k_5$ is made a function of static pressure by the potentiometer 38 to compensate for the variation of $T_L$ with static pressure, for example, by connecting the wiper of the potentiometer 38 through altitude-pressure correction cams 27 to the shaft 25.

The signal from the potentiometer 26 is compensated by the signal from the algebraic summation device 33 in the altitude summation computer 34 in order that the output signal from the computer 34 to the altitude utilization apparatus, indicated by the legend, is extremely precise and representative of the true altitude data.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. Pressure responsive apparatus for aircraft comprising pressure sensing means for sensing an actual pressure condition experienced by said aircraft, relatively long pressure conduit means, pressure computing means connected by said conduit means to said pressure sensing means for providing a first signal substantially representative of said sensed pressure condition, said conduit means introducing an undesirable lag in the transmission of the pressure sensed by said sensing means with respect to that received by said pressure computing means, said pressure computing means including follow-up servo means which introduces a velocity error whereby said first signal includes undesirable characteristics due to said transmission lag and said velocity error, said pressure computing means including a bellows and pick-off means directly responsive to the movement of said bellows for providing a second signal, means responsive to said second signal for providing a signal representative of the rate of change of said second signal for compensating said transmission lag, amplifying means responsive to said second signal for varying the gain to provide an amplified signal having a voltage gradient for compensating said velocity error, means for combining said rate and amplified signals for providing a third signal having characteristics which compensate for said undesirable characteristics of the first signal, and means for combining said first and third signals to provide an output signal representative of said sensed condition.

2. Pressure responsive apparatus for aircraft comprising a pressure sensing probe for sensing an actual pressure condition experienced by said aircraft, force balance type pressure computing means including a bellows connected to a pick-off and to a torsion bar, pressure conduit means connected between said pressure sensing probe and said bellows which introduces an undesirable lag in the transmission of the pressure sensed by said probe with respect to that received by said bellows, said pick-off providing a signal representative of the movement of said bellows, a follow-up servo connected to drive said torsion bar in accordance with said pick-off signal, said follow-up servo introducing a velocity response lag due to its relatively slow follow-up action, first signal generating means connected to said torsion bar for providing a first signal representative of a function of the pressure sensed by said probe but including errors due to said transmission line and velocity response lags, second signal generating means directly responsive to said pick-off signal for providing a second signal representative of a function of the pressure sensed by said probe but including only said transmission line lag, means including a rate circuit responsive to said second signal for providing a third signal representative of the rate of change thereof for compensating said transmission lag, amplifying means responsive to said second signal for varying the gain to provide an amplified signal having a voltage gradient for compensating said velocity error, means for combining said amplified and third signals for providing a compensating signal having characteristics which compensate for said lags of said first signal, and means for combining said compensating signal and said first signal to provide a compensated signal that is a function of the actual pressure condition.

3. In an altitude control device for high performance aircraft, a probe responsive to static pressure, force balance pressure computing means, said pressure computing means including a bellows connected to a torsion bar, a pick-off connected to said bellows for providing a pick-off signal representative of the movement thereof, a follow-up servo connected to drive said torsion bar in accordance with said pick-off signal, said follow-up servo introduces a velocity response lag due to its follow-up action, said probe being connected to said bellows by means of a relatively long pneumatic transmission line which introduces response lags, a first signal generating means connected to said torsion bar for providing a first signal representative of the pressure altitude but including errors due to said pneumatic transmission line and velocity response lags, a second signal generating means directly responsive to said pick-off signal for providing a displacement signal representative of the function of the pressure altitude, a rate circuit responsive to said displacement signal for providing a rate signal representative of a rate of change thereof for compensating said transmission lag, amplifying means responsive to said displacement signal for varying the gain to provide an amplified displacement signal having a voltage gradient for compensating said velocity, error, means for combining said amplified and rate signals for providing a compensating signal having characteristics which compensate for said pneumatic transmission line and velocity response lags of said first signals, and means for combining said compensating signal and said first signal to provide a compensated signal representative of the actual pressure altitude.

References Cited in the file of this patent

UNITED STATES PATENTS

| | | |
|---|---|---|
| 2,445,335 | Philbrick et al. | July 20, 1948 |
| 2,729,780 | Miller et al. | Jan. 3, 1956 |
| 2,934,267 | Wirkler et al. | Apr. 26, 1960 |
| 2,949,779 | McKenney et al. | Aug. 23, 1960 |